United States Patent [19]

Neumann

[11] Patent Number: 4,783,727
[45] Date of Patent: Nov. 8, 1988

[54] DC/DC CONVERTER

[75] Inventor: Erhard Neumann, Rudersberg, Fed. Rep. of Germany

[73] Assignee: Eckhardt AG, Stuttgart, Fed. Rep. of Germany

[21] Appl. No.: 49,597

[22] Filed: May 14, 1987

[30] Foreign Application Priority Data

May 14, 1986 [DE] Fed. Rep. of Germany ....... 3616160

[51] Int. Cl.$^4$ ............................................. H02H 7/122
[52] U.S. Cl. ........................................ 363/20; 363/56; 361/91
[58] Field of Search .................... 363/20, 55, 21, 56, 363/95, 98; 361/90, 91, 93

[56] References Cited

U.S. PATENT DOCUMENTS

| 4,389,702 | 6/1983 | Clemente et al. | 363/21 |
| 4,447,741 | 5/1984 | Moschopoulos | 363/21 X |
| 4,675,796 | 6/1987 | Gautherin et al. | 363/56 X |

FOREIGN PATENT DOCUMENTS

| 1952016 | 10/1969 | Fed. Rep. of Germany . |
| 2719026 | 4/1977 | Fed. Rep. of Germany . |

OTHER PUBLICATIONS

"Modelling and Design of Non-Dissipative LC Snubber Networks", Shaughnessy et al., Proceedings of Powercon 7, 7th National Solid State Power Conversion Conference, Mar. 1980, G4-1 to G4-9.

Elektronik, 24/Rene Sibille, "Ferritwerkstoffe und Kerne fur Schaltnetzteile", pp. 101–102 (3/12/82).

Elektronik, Dipl.-Ing. Karl Ruschmeyer, "Drosseln mit Permanent-Magnetischer Vormagnetisierung", pp. 80–82 (3/84).

Article—"Eigenschaften und Arbeitsprinzipien von Schaltnetzteilen" (Switching Grid Components), expert-Verlag, 2nd Ed., 1982, pp. 25,81 (FIG. 2.23).

Primary Examiner—Patrick R. Salce
Assistant Examiner—Emanuel Todd Voeltz
Attorney, Agent, or Firm—Burns, Doane, Swecker & Mathis

[57] ABSTRACT

A DC/DC converter has a transformer and a switching transistor provided with a discharge circuit and activated by an actuating circuit. The discharge circuit includes a choke in series with two reverse oriented diodes, and a capacitor connected between the junction of the diodes and the collector of the transistor. With this arrangement, the conventional demagnetizing winding of the transformer may be omitted. The duty factor may be chosen very high, to about 0.75, and the actuation of the switching transistor upon occurrence of a maximum negative magnetizing current may lead to a doubling of the usable induction.

9 Claims, 2 Drawing Sheets

DC/DC CONVERTER

BACKGROUND OF THE INVENTION

The present invention relates to a DC/DC converter of the type having a transformer whose primary winding current is controlled by a transistor connected to a discharge circuit containing a choke, a diode and a capacitor. The secondary winding of the transformer supplies an output voltage to a load by means of a grid consisting of a rectifier diode, a free-running diode and a storage choke. Such converters are known for example from J. Wustehube, "Schaltnetzteile" ("Switching Grid Components"), expert-Verlag, 2nd. edition, 1982, p. 81, FIG. 2.23.

In these types of converters, during the conducting phase of the transistor the current of the transformer is transferred from the primary winding to the secondary winding and flows through the rectifier diode and the storage choke into the load connected to the outlet. In this process the current rises linearly in the choke and thus at the output. If the transistor is blocked, the rectifier diode is also in a blocking state and the free-running diode receives the decreasing current of the choke.

The magnetizing energy received by the transformer during the conducting phase flows, during the blocked phase, through a demagnetizing winding and the discharge diode back into an inlet capacitor. However, prior to the conduction of current by the demagnetizing winding, a steep rise of the collector-emitter voltage occurs and can cause an overshoot voltage, depending on the level of the collector current, the parasitic inductances between the primary and the secondary windings, and the switching velocity of the transistor.

To attenuate these undesirable effects, RCD or RC loading of the transistor has been used.

In the operation of such a converter, for example with a battery as the input source, the turn ratio of the windings must be designed for the lowest battery discharge voltage. In the case of high currents, high transmission frequencies and low output voltages the switching times of the diodes can no longer be neglected so that the duty factor must be $V_{Teff} < 0.5$ and is frequently set at $V_{TMAX} = 0.45$ (See Wustehube, p. 64, before §2.9).

The disadvantages of the known configurations follow from the above. More particularly, due to the low maximum duty factor of $V_T = 0.45$ at relatively low values for the ratio K of windings in the primary and secondary windings in the transformer (K=2...3), and with higher power outputs of the converter ($P_W > 100W$), high collector switching currents occur and in the case of bipolar transistors there are turn-off losses.

OBJECT AND BRIEF STATEMENT OF THE INVENTION

It is the object of the invention to provide a DC/DC converter having a high duty factor, a low transistor switching current, a favorable specific weight coefficient and volume factor, together with good efficiency and high operating safety.

This object is attained according to the invention by providing a diode in parallel with the collector-emitter current path of the transistor. Further, the discharge circuit contains the choke in series with two diodes, and the discharge capacitor is connected between the junction of the diodes and the collector of the transistor.

A comparison with the prior art circuit shows that a converter according to the invention has no particular demagnetizing winding and the switching transistor is operated with a turn-off balance that is in principle free of loss. During the voltage rise at its collector the switching transistor receives the primary current of the transformer and produces a counter voltage during a forward half cycle which forces the demagnetizing process. When this counter voltage attains its maximum, the reverse half cycle begins, wherein the energy stored in the capacitor flows back through the primary winding to the input power supply. This current leads to a negative magnetization of the transformer with an amplitude which is a function of the energy previously supplied to the capacitor. In case of high power and a high duty factor, if the negative magnetizing current can no longer attenuate to zero due to earlier activation of the switching transistor, the negative range of the magnetizing characteristic is also used for the transfer of power, so that the usable magnetic induction $\Delta B$ rises to double its value. The magnetic circuits of the transformer and the discharge choke are designed so that they become partially saturated under high loads, thereby reducing the time required for the reaction cycles.

In the operation of the converter at constant frequency using pulse width modulation, the structural elements are designed for the lowest voltage with maximum output current ($U_E = U_{EMIN}$, $V_T = V_{TMAX}$, $i_M = -i_{MMAX}$). In case of operation of the converter with variable frequency, the mode of operation of magnetization optimization with $\Delta B = \Delta B_{MAX}$ is obtained by measuring a negative magnetizing current (for example through a shunt resistance) and actuating the switching transistor at its maximum. The capacitors and inductors that are used for the oscillating circuits are designed so that the frequency obtained as a function of the load varies as little as possible. In case of a small load the frequency is limited in the upward direction and under a high load in the downward direction ($f_{MIN} \leq f \leq f_{MAX}$).

Both in frequency variable operation and with pulse width modulation the switching transistor is discharged by the negative magnetizing current upon actuation.

It is possible to decrease the weight and volume of the choke by premagnetizing it with a permanent magnet. A permanent magnet of a ferrite material can be inserted in the air gap of the magnetic circuit, with the coil excitation being directed so that it will oppose the permanent magnet flow.

BRIEF DESCRIPTION OF THE DRAWINGS

An embodiment of the invention is described below in more detail with reference to the drawings. In the drawings.

DETAILED DESCRIPTION OF THE DRAWINGS

Figure 1:
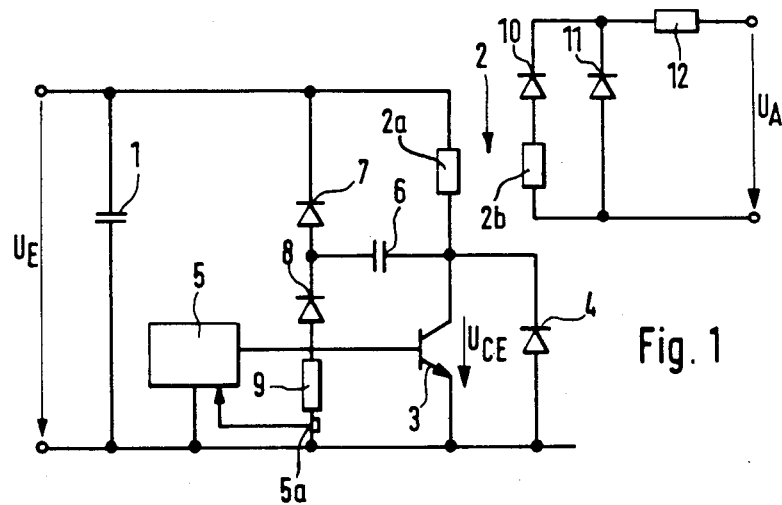
FIG. 1 is a schematic circuit diagram of a DC/DC converter.

FIG. 1 is a schematic circuit diagram of a DC/DC converter according to the present invention. By way of example, the converter may be used as an onboard grid or charging device to provide a 12/24 V. power supply to consumers and to charge the 12/24 V. onboard battery of an electric or hybrid vehicle from the traction battery with voltages of approximately between 40 V. and 200 V. The input voltage $U_E$ is buffered by means of an input capacitor 1 located between the positive and negative supply lines. This voltage is applied periodically by a switching transistor 3 to the primary winding 2a of a transformer 2. The switching transistor 3 is actuated by a conventional actuating unit 5 (not described in detail). This actuating unit may control the transistor at constant frequency. Alternatively, it might operate with magnetization optimization at variable frequency, with the actuation point occurring at the negative maximum of the magnetizing current. If the switching transistor is closed, this current corresponds to the current through a choke 9, described in more detail below. This current is determined by means of a suitable measuring element 5a, for example a shunt resistor, and is processed in the actuating unit 5.

A diode 4 is connected in parallel with the switching path of the transistor 3 and oriented to pass current in the direction from the emitter to the collector.

The discharge circuit of the transistor consists of the series connection of the aforementioned choke 9 with two diodes 7 and 8, which are connected to allow current to pass from the minus pole to the plus pole of the input voltage $U_E$. A capacitor 6 is connected between the junction of the two diodes 7, 8 and the collector of the transistor 3.

The secondary winding 2b of the transformer 2 is connected in series with a rectifier diode 10. A free-running diode 11 is placed in parallel with the winding 2b and the diode 10. In series with the free-running diode 11 is a storage choke 12. The output voltage $U_A$ appears across the diode 11 and choke 12. The secondary side of the converter thus does not differ fundamentally from the conventional circuit.

The mode of operation of the DC/DC converter according to the invention is explained below with reference to FIGS. 2 and 3.

Figure 2:
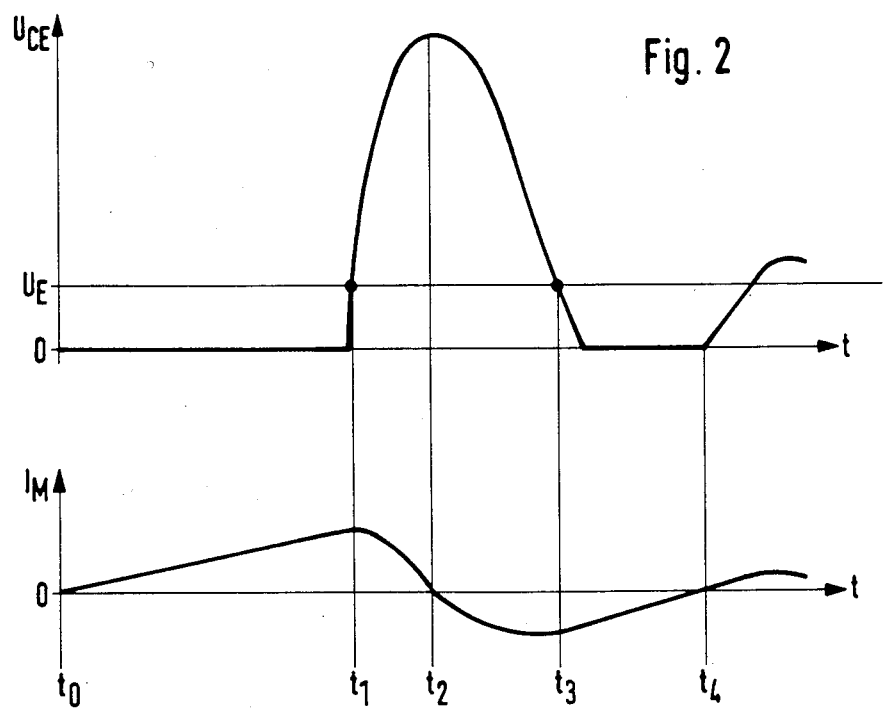
FIG. 2 a graph of the collector-emitter voltage of the transistor and the magnetizing current of the transformer.

FIG. 2 shows the aperiodic variation of the collector-emitter voltage with the magnetizing current, wherein one cycle of operation is divided into different time segments. The definition of the time segments is relative to the magnetizing current of the transformer 2.

From $t_0$ to shortly before $t_1$ the transistor is on and the magnetizing current $i_M$ rises linearly. The rise of the magnetizing current is terminated as soon as the transistor is deactivated at time $t_1$. The voltage at the windings 2a and 2b changes polarities ($U_{CE} > U_E$) and the free-running diode 11 carries the load current. The collector-emitter voltage rise takes place shortly before $t_1$ very rapidly until $U_{CE} > U_E$ and the scatter inductance is discharged.

The magnetizing energy $E_M$ stored in the transformer amounts, together with the magnetizing inductance LM, to:

$$E_M = \tfrac{1}{2} L_M i_M^2 \tag{1}$$

with the current $$i_M = U_E / L_M (t_1 - t_0) \tag{2}$$

$$E_M = \tfrac{1}{2} U^2_E / L_M (t_1 - t_0)^2 \tag{3}$$

In the time segment from $t_1$ to $t_2$ the magnetizing energy $E_M$ of the transformer 2 is discharged in the capacitor 6. The period duration of this series oscillating circuit is determined by the magnetizing inductance $L_M$ and the capacitance $C_6$ of the capacitor 6.

$$t_2 - t_1 = \pi/2 \sqrt{L_M C_6} \tag{4}$$

with $E_{C6} = \tfrac{1}{2} C_6 U^2_{C6}$ (5)

and $\hat{E}_{C6} = \hat{E}_M$ (6)

it follows for the voltage:

$$U_{C6} = \frac{U_E (t_1 - t_0)}{\sqrt{L_M C_6}} \tag{7}$$

Since the diode 11 is conducting from $t_1$ to $t_2$, the maximum collector-emitter voltage (without scatter inductances) $U_{CE}$ becomes $$U_{CE} = U_E + U_{C6} \tag{8}$$

At the time $t_2$ ($i_M = 0$) the transformer 2 is demagnetized and the switching transistor 3 may be again actuated.

In the time segment $t_2$ to $t_3$ the switching transistor 3 is blocked. This time segment is characterized in that the energy of the capacitor 6 flows back through the choke 9, the diode 8 and the primary winding 2a into the input capacitor 1. During this process, the inductance $L_9$ of the choke 9 and the capacitance $C_6$ participate in addition to the magnetizing inductance $L_M$:

$$t_3 - t_2 = \pi/2 \sqrt{(L_M + L_9)C_6} \tag{9}$$

At time $t_3$ the negative magnetizing current attains its maximum and the capacitor 6 is discharged to the input voltage $U_E$. The time $t_3$ ($i_M = -\hat{i}_M$) serves as the actuating point in time of the switching transistor 3, if the operation is to be with magnetization optimization at the maximum usable induction ($\Delta B = \Delta B_{MAX}$.)

In the subsequent time segment $t_3$ to $t_4$ the capacitor 6 is recharged to $-U_E$ and the energy is fed back to the input capacitor by the principal inductance $L_M$ and the choke 9 through the diodes 4, 7 and 8.

As seen from the collector-emitter voltage and magnetizing current diagram in FIG. 2, the connection of the structural elements 6, 7, 8 and 9 with the primary winding 2a of the transformer, in combination with the actuating unit 5, performs several advantageous functions:

the deactivation discharge of the transistor 3 occurs in principle without loss, the demagnetization of the transformer 2 is adjusted to the prevailing load, an increase in the usable induction $\Delta B$, leading to a smaller effective core volume, the actuation of the transistor 3 with a correspondingly lower switching loss, and the duty factor $V_T$ can be substantially increased with shorter cycle times according to Equations 4 and 9.

It is significant that the demagnetizing energy flows in the capacitor 6 only, and thus only the voltage across the capacitor 6 leads to the demagnetization of the core 5 and the magnetic circuit. If the voltage at the capacitor 6 exceeds 1.5 times the input voltage $U_E$ and thus the voltage across the switching transistor 3 is 2.5 times the input voltage $U_E$, the switching transistor 3 and the actuating unit 5 are protected by the diode 4. The diode 4 prevents the actuation of the switching transistor 3 over its collector base path, as soon as the voltage at the collector becomes negative. The diode 4 therefore makes it possible to operate the converter with high voltages at the blocked switching transistor 3 thereby contributing significantly to the aforementioned increase in the duty factor $V_T$. As will be explained in relation to FIG. 3, with the aid of the diode 4 and optionally a correspondingly dimensioned nonlinear choke 9 and the measuring element 5a, the duty factor $V_T$ may be increased to values of approximately $V_{TMAX} = 0.75$.

The great advantage of the higher duty factor $V_T$ is that it is possible to operate with lower collector currents in keeping with the equation $i_C = [1/(V_{TMAX}K)]i_A$. In the primary and input filter circuit this leads to a smaller effective current and to lower losses. If a bipolar transistor is used as the switching transistor, it requires a lower driving power and has lower conduction and switching losses. The transistor should be designed for a correspondingly higher collector-emitter voltage $U_{CE}$ (Equation 8), but because it is deactivated in the discharged state and carries no collector current during the time of high voltage, an expanded voltage range with higher maximum permissible collector-emitter voltages (typically designated $U_{CEX}$ or $U_{CEV}$) may be utilized.

A further advantage of the higher duty factor $V_T$ relates to the storage choke 12. Its inductance and thus its weight and volume may be reduced at the same maximum output current.

To prevent an increase in the rippling of the output current even at a lower duty factor, an inductance with a nonlinear characteristic may be used, whereby the cross section of the magnetic circuit is partially reduced in a smaller range. This may be obtained for example by a tapered center leg.

A further decrease of the volume and weight of the storage choke 12 is possible if it is premagnetized by means of a permanent magnet. A ferrite permanent magnet can be inserted into the air gap of the magnetic circuit, with the coil excitation being directed so that it is opposed to the permanent magnet flow. This configuration is not shown in the drawing.

As set forth above, the current determined with the aid of the measuring element 5a serves in particular to determine the negative maximum of the magnetizing current in a magnetization optimized operation and the actuation of the switching transistor 3 in dependence on it. This provides the advantage that the actuation of the switching transistor 3 is produced on the primary side. No action of the secondary side at the time of the actuation, for example by means of optocouplers or the like, is required for potential separation. Deactivation takes place as a function of voltage regulation or control on the output side of the transducer by means of an optocoupler or signal transmitter or the like.

In contrast to FIG. 2, wherein the transducer is triggered only once and the negative magnetizing current oscillates freely, FIG. 3 shows three loading states of the transducer with pulse width modulation and a period duration T.

Figure 3A:
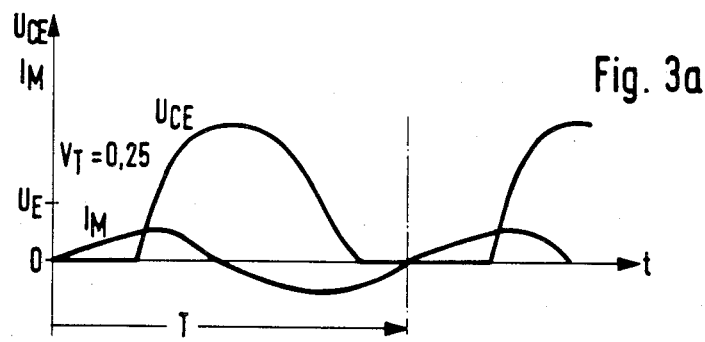
FIGS. 3a, b, c are a graph of the variation of the collector-emitter voltage and the magnetizing current at three different duty factors and constant period duration.
Figure 3B:
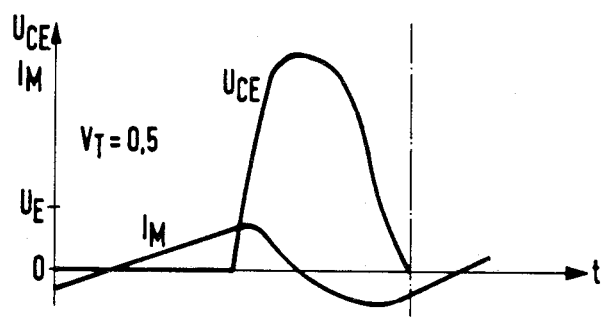
Figure 3C:
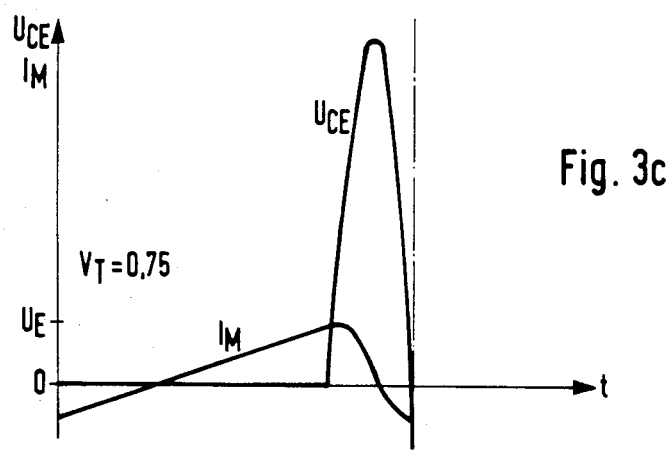

In the lowest loading case according to FIG. 3a with the duty factor $V_T = 0.25$, the negative magnetizing current $i_M$ can attenuate to zero, while with the higher duty factors—as shown in FIG. 3b with $V_T = 0.5$ or in FIG. 3c with $V_T = 0.75$—the actuation process takes place at a higher negative magnetizing current. This provides the advantage that the usable flux density rise $\Delta B$ is increased by a factor of 2 and the winding numbers of the transformer may be reduced correspondingly.

It is particularly favorable to realize the magnetic circuits of the transformer 2 and the choke 9 (see Equations 4 and 9) with nonlinear magnetic characteristics (load dependent partial saturation). Thus with a higher duty factor $V_T$ and a larger current, the time segments $(t_2 - t_1)$ and $(t_3 - t_2)$ can be shortened and a shorter demagnetizing time is opposed by a longer actuation duration. The structural elements are preferably selected so that the maximum of the negative magnetizing current is attained only at the highest possible load.

In an alternative operating mode of the converter the frequency is not fixed at the beginning with a minimum state of load and the switching transistor is actuated when the magnetizing current is at its negative maximum.

It is therefore characteristic for both actuation modes that the demagnetization of the transformer is self-stabilized with a high duty factor and a high load by the correspondingly high loading of the choke 9 and shorter cycle times of the magnetizing energy.

What is claimed is:

1. A DC/DC converter, comprising:
    a transformer having a primary winding and a secondary winding;
    a transistor having a collector-emitter path for selectively connecting said primary winding to a D.C. input voltage to control a flow of current through said primary winding;
    a first diode connected in parallel with said collector-emitter path and oriented to allow current to flow in a direction from the emitter to the collector of said transistor;
    a discharge circuit including a choke connected in series with two diodes across said D.C. input voltage, said diodes being oriented to allow current to flow in a direction from a negative potential to a positive potential of said input voltage, and a capacitor connected between a junction of said two diodes and the collector of said transistor, whereby said discharge circuit periodically produces a negative magnetization current through said transformer primary winding; and
    an input circuit including a rectifier diode, a free running diode and a storage choke connected to said secondary winding.

2. The converter of claim 1 wherein said storage choke is premagnetized and includes a coil with a permanent magnet located in an air gap, the magnetic field of said permanent magnet being opposed to the magnetic field of said coil.

3. The converter of claim 1 wherein said first diode prevents said transistor from being actuated when a high voltage is present at its collector during a blocking state of the transistor.

4. The converter of claim 1 wherein at least one of said transformer and said choke of said discharge circuit has non-linear magnetic characteristics.

5. The converter of claim 1 wherein said transistor operates with a duty cycle greater than 0.5.

6. The converter of claim 5 wherein said duty cycle has a maximum value of approximately 0.75.

7. A DC/DC converter, comprising:
   a transformer having a primary winding and a secondary winding;
   a transistor having a collector-emitter path for selectively connecting said primary winding to a D.C. input voltage to control a flow of current through said primary winding;
   a first diode connected in parallel with said collector-emitter path and oriented to allow current to flow in a direction from the emitter to the collector of said transistor;
   a discharge circuit including a choke connected in series with two diodes across said D.C. input voltage, said diodes being oriented to allow current to flow in a direction from a negative potential to a positive potential of said input voltage, and a capacitor connected between a junction of said two diodes and the collector of said transistor;
   means for measuring the current through said choke in said discharge circuit; and
   an input circuit including a rectifier diode, a free running diode and a storage choke connected to said secondary winding.

8. The converter of claim 7 further including means responsive to said measuring means for actuating said transistor when the measured current is at a maximum negative value.

9. A DC/DC converter, comprising:
   a transformer having a primary winding and a secondary winding;
   a transistor having a collector-emitter path for selectively connecting said primary winding to a D.C. input voltage to control a flow of current through said primary winding, wherein said transistor operates with a duty cycle greater than 0.5;
   a first diode connected in parallel with said collector-emitter path and oriented to allow current to flow in a direction from the emitter to the collector of said transistor;
   a discharge circuit including a choke connected in series with two diodes across said D.C. input voltage, said diodes being oriented to allow current to flow in a direction from a negative potential to a positive potential of said input voltage, and a capacitor connected between a junction of said two diodes and the collector of said transistor; and
   an output circuit including a rectifier diode, a free running diode and a storage choke connected to said secondary winding.

* * * * *